(12) United States Patent
Waki

(10) Patent No.: US 7,008,994 B1
(45) Date of Patent: Mar. 7, 2006

(54) AQUEOUS PIGMENT DISPERSION, PROCESS FOR PRODUCING THE SAME, AND WATER-BASED INK COMPRISING THE SAME

(75) Inventor: Minoru Waki, Himeji (JP)

(73) Assignee: Mikuni Shikiso Kabushiki Kaisha, Himeji (JP)

( * ) Notice: Subject to any disclaimer, the term of this patent is extended or adjusted under 35 U.S.C. 154(b) by 0 days.

(21) Appl. No.: 09/673,194

(22) PCT Filed: Apr. 13, 1999

(86) PCT No.: PCT/JP99/01954

§ 371 (c)(1),
(2), (4) Date: Oct. 12, 2000

(87) PCT Pub. No.: WO99/52966

PCT Pub. Date: Oct. 21, 1999

(30) Foreign Application Priority Data

Apr. 15, 1998 (JP) .................................. 10/104417

(51) Int. Cl.
*C08L 33/02* (2006.01)
*C08L 75/04* (2006.01)
*C09D 11/10* (2006.01)

(52) U.S. Cl. ........................ 524/556; 524/590; 523/160
(58) Field of Classification Search ................ 523/160, 523/161; 524/556, 589, 590; 106/31.6
See application file for complete search history.

(56) References Cited

U.S. PATENT DOCUMENTS

| 3,980,602 A | * | 9/1976 | Jakubauskas ................ 524/131 |
| 5,231,131 A | * | 7/1993 | Chu et al. ..................... 524/504 |
| 5,348,997 A | * | 9/1994 | Kato et al. .................... 524/189 |
| 5,444,118 A | * | 8/1995 | Tsuruoka et al. ............. 524/828 |
| 5,492,952 A | * | 2/1996 | Tonogaki et al. ............. 524/192 |
| 5,604,276 A | * | 2/1997 | Suga .......................... 524/100 |
| 5,814,685 A | * | 9/1998 | Satake et al. ................ 523/201 |
| 5,853,861 A | * | 12/1998 | Held ........................... 428/207 |
| 6,136,890 A | * | 10/2000 | Carlson et al. .............. 523/160 |
| 6,204,319 B1 | * | 3/2001 | Houze et al. ................ 524/495 |
| 6,262,152 B1 | * | 7/2001 | Fryd et al. ..................... 524/90 |

FOREIGN PATENT DOCUMENTS

| EP | 0 395 955 | | 11/1990 |
| JP | 48-10181 | | 2/1973 |
| JP | 50-87138 | | 7/1975 |
| JP | 64-81867 | | 3/1989 |
| JP | 5-255567 | | 10/1993 |
| JP | 5-302037 | | 11/1993 |
| JP | 09104834 A | * | 4/1997 |
| JP | 9-255867 | | 9/1997 |

OTHER PUBLICATIONS

English Translation of JP 09255867 (1997).*
English Translation of EP395955 (1990).*
English Translation of JP 09104834 A (1997).*

* cited by examiner

*Primary Examiner*—Callie Shosho
(74) *Attorney, Agent, or Firm*—Armstrong, Kratz, Quintos, Hanson & Brooks, LLP

(57) ABSTRACT

A water-based pigment dispersion in which a pigment is dispersed with a water soluble or self-emulsifying thermoplastic resin containing carboxylic group, characterized in that the ratio of the pigment to the thermoplastic resin containing the carboxylic group (pigment/thermoplastic resin containing carboxylic group (weight ratio of effective solid matter)) is 10/10 to 10/1, the thermoplastic resin containing the carboxylic group is cross-linked with a cross-linking agent after the pigment is dispersed with the thermoplastic resin, and the ratio of the cross-linking agent to the thermoplastic resin containing the carboxylic group (cross-linking agent/thermoplastic resin containing carboxylic group (weight ratio of effective solid matter)) is 1/100 to 50/100; a process for preparing the same; and a water-based ink containing the same. The water-based pigment dispersion shows excellent light resistance, water resistance, alkali resistance, solvent resistance and stability during the passage of time at the same time.

7 Claims, No Drawings

AQUEOUS PIGMENT DISPERSION, PROCESS FOR PRODUCING THE SAME, AND WATER-BASED INK COMPRISING THE SAME

TECHNICAL FIELD

The present invention relates to a water-based pigment dispersion, a process for preparing the same and a water-based ink containing the same. More particularly, the present invention relates to a water-based pigment dispersion showing excellent light resistance, water resistance, alkali resistance and solvent resistance, and in addition, showing excellent stability during the passage of time, which can be suitably used for coating materials, paper coating, textile printing, writing ink, printing ink, ink-jet printing ink, color filters, cosmetic materials and electrophotographic toner. Furthermore, the present invention relates to a process for easily preparing the water-based pigment dispersion and a water-based ink containing the water-based pigment dispersion.

BACKGROUND ART

In general, pigments have been used for coating materials, printing ink and writing ink. Most of the pigments were solvent type. However, in consideration of bad influence due to the solvents for human bodies, saving of resources and countermeasure for environment pollution, recently solvent type coating materials and solvent type ink are gradually transformed into water-based type coating materials and water-based type ink, respectively. Although various physical properties such as light resistance, water resistance, alkali resistance and solvent resistance are demanded in the field of coating materials and ink, the water-based type coating materials and the water-based type ink have many problems for physical properties.

For instance, in the field of coating materials, when a surface active agent is used as a dispersant for a pigment, coating film property such as water resistance of coating materials is considerably lowered. Accordingly, in general, an alkali-neutralized type aqueous resin has been used as a dispersant. However, even if the aqueous resin was used, coating film properties such as alkali resistance and solvent resistance were poorer than those of solvent type coating materials. The properties of coating materials in which the aqueous resin was used were insufficient.

Similarly, as to writing ink, various physical properties such as water resistance, alkali resistance and solvent resistance are demanded in addition to writing property. However, these physical properties including stability during the passage of time are, indeed, insufficient.

In order to overcome the above defects, for instance, the following compositions are proposed. A water-based coating composition of which solvent resistance is improved and in which aggregation of a pigment is prevented during preservation by dispersing the pigment with cross-linked resin particles having an ionic group (Japanese Unexamined Patent Publication No. 22367/1990) A coating composition containing a pigment for printing ink, which is prepared by kneading a water-based cross-linked resin dispersion prepared by reacting isocyanate group (terminal group) in an urethane polymer and cross-linked, and a pigment (Japanese Unexamined Patent Publication No. 138518/1995) A water-based coating composition of which coloring and gloss are improved by carrying out co-precipitate using polyurethane as anionic cross-linked resin particles under the acidic condition and redispersion (Japanese Unexamined Patent Publication No. 170039/1996).

However, in the above coating compositions, a cross-linked resin is used as a dispersant. Molecular chain of the cross-linked resin is long, and it is difficult to adsorb the cross-linked resin around a pigment. As a result, when the pigment is dispersed with the cross-linked resin, it is difficult to sufficiently disperse particles, and there is bad influence for stability during the passage of time. Accordingly, the above coating compositions are insufficient.

For instance, the following various methods are proposed. A method for preventing elution of a pigment from a printing ink coating layer even under the condition at higher humidity by interacting the specific carboxylic acid as a dispersant for a pigment with an aliphatic polyol and an isocyanate (Japanese Unexamined Patent Publication No. 134635/1980) A process for preparing water-based writing ink of which light resistance, water resistance and solvent resistance are improved, and in which dispersing stability of a pigment is improved by using a polymer mainly comprising a polyester having both hydrophilic parts and lipophilic parts, as a dispersant (Japanese Unexamined Patent Publication No. 26070/1985).

However, improvement of water resistance, alkali resistance and solvent resistance of pigment ink prepared in accordance with the above methods is insufficient, and dispersion of the pigment is insufficient. As a result, stability during the passage of time is poor, so that precipitate is generated. Furthermore, light resistance is poor. Accordingly, quality of the above pigment ink is insufficient.

A water-based dispersion prepared by wrapping a pigment in a resin to form a capsule is disclosed in Japanese Unexamined Patent Publication No. 221137/1991 and Japanese Unexamined Patent Publication No. 151342/1997. There are characteristics that dispersion step is saved during preparation of the water-based dispersion, and that the water-based dispersion is excellent in water resistance and redispersing property. However, phase transition and emulsification step from an organic phase is necessitated when the above water-based dispersion is prepared. In addition, because a solvent in the organic phase must be removed and collected, steps for preparation are complicated.

The present invention has been completed in consideration of the above prior arts. An object of the present invention is to provide a water-based pigment dispersion showing excellent light resistance, water resistance, alkali resistance and solvent resistance, and in addition, showing excellent stability during the passage of time, which can be suitably used for coating materials, paper coating, textile printing, writing ink, printing ink, ink-jet printing ink, color filters, cosmetic materials and electrophotographic toner, and to provide a process for easily preparing the water-based pigment dispersion and a water-based ink containing the water-based pigment dispersion.

DISCLOSURE OF INVENTION

The present invention relates to a water-based pigment dispersion in which a pigment is dispersed with a water soluble or self-emulsifying thermoplastic resin containing carboxylic group, characterized in that the ratio of the pigment to the thermoplastic resin containing the carboxylic group (pigment/thermoplastic resin containing carboxylic group (weight ratio of effective solid matter)) is 10/10 to 10/1, the thermoplastic resin containing the carboxylic group is cross-linked with across-linking agent after the pigment is dispersed with the thermoplastic resin, and the ratio of the cross-linking agent to the thermoplastic resin containing the carboxylic group (cross-linking agent/thermoplastic resin containing carboxylic group (weight ratio of effective solid matter)) is 1/100 to 50/100;

a process for preparing the above water-based pigment dispersion characterized in that the process comprises (1) a step for predispersing a pigment and a water soluble or self-emulsifying thermoplastic resin containing a carboxylic group to give a mixture, (2) a step for treating the mixture by a dispersing machine and dispersing the pigment with the thermoplastic resin containing the carboxylic group to give a dispersion, (3) a step for cross-linking the thermoplastic resin containing the carboxylic group in the dispersion with a cross-linking agent, and (4) a step for adjusting pH of the dispersion containing the pigment and the thermoplastic resin containing the carboxylic group, which is cross-linked, to alkaline range, wherein pH of the dispersion at finishing cross-linking reaction is 6.0 to 8.0; and a water-based ink containing the above water-based pigment dispersion.

BEST MODE FOR CARRYING OUT THE INVENTION

The water-based pigment dispersion of the present invention is, as mentioned above, a dispersion in which a pigment is dispersed with a water soluble or self-emulsifying thermoplastic resin containing carboxylic group (hereinafter sometimes referred to as simply "thermoplastic resin"), the ratio of the pigment to the thermoplastic resin (pigment/thermoplastic resin (weight ratio of effective solid matter)) is 10/10 to 10/1, the thermoplastic resin is cross-linked with a cross-linking agent after the pigment is dispersed with the thermoplastic resin, and the ratio of the cross-linking agent to the thermoplastic resin (cross-linking agent/thermoplastic resin (weight ratio of effective solid matter)) is 1/100 to 50/100.

The thermoplastic resin used in the present invention effects as a dispersant for the pigment. The thermoplastic resin is excellent in miscibility and dispersing property for the pigment. In consideration of dispersing ability in water-based system and superiority in stabilization, the thermoplastic resin showing water solubility or self-emulsifying property is used. The thermoplastic resin has carboxylic groups. The number of carboxylic group in the thermoplastic resin is not particularly limited. In addition, the thermoplastic resin may have the other functional groups such as hydroxyl group and carbonyl group.

Typical examples of the thermoplastic resin are, for instance, a vinyl acetate resin such as polyvinyl acetate, polyvinyl alcohol or acetal resin; acrylic resin such as polyacrylic acid ester, polyacrylonitryl or polyacrylamide; terpene resin; polyurethane; polyamide such as nylon or silicone resin; and the like. In particular, acrylic resin and polyurethane are suitably used.

The acrylic resin is particularly preferred because the acrylic resin is excellent in light resistance and is easily processed. Concrete examples of the acrylic resin are, for instance, a (meth)acrylic acid copolymer such as styrene-acrylic acid copolymer, styrene-methylstyrene-acrylic acid copolymer, styrene-acrylic acid-(meth)acrylic acid ester copolymer ("ester" denotes a lower alkyl ester in which the number of carbon atom of an alkyl group is about 1 to 4, hereinafter referred to the same), styrene-methacrylic acid copolymer, styrene-methacrylic acid-(meth)acrylic acid ester copolymer, acrylic acid-(meth)acrylic acid ester copolymer or methacrylic acid-(meth)acrylic acid ester copolymer; a maleic acid copolymer such as styrene-maleic acid copolymer, styrene-methylstyrene-maleic acid copolymer, styrene-acrylic acid ester-maleic acid copolymer or styrene-methacrylic acid ester-maleic acid copolymer; a styrene copolymer such as styrene-acrylic acid ester-styrene sulfonic acid copolymer, styrene-methacrylsulfonic acid copolymer or styrene-acrylic acid ester-allylsulfonic acid copolymer; and the like. These can be used alone or in admixture thereof.

The polyurethane is particularly preferred because the polyurethane is excellent in adhesive property and flexibility. The polyurethane is classified based on the kind of polyol among resin components. Examples of the polyurethane are, for instance, polyester type polyurethane, polycarbonate type polyurethane, polyether type polyurethane and the like. These can be used alone or in admixture thereof.

A thermoplastic resin which has number average molecular weight of 2000 to 20000 and acid value of 30 to 300 is preferable. In order to exhibit excellent dispersing ability for the pigment, it is desired that the number average molecular weight is at least 2000, preferably at least 2500, and at most 20000, preferably at most 15000. For instance, when the thermoplastic resin is neutralized with an organic amine, in order to prevent dispersing ability from lowering due to difficulty for water-solubilization, it is desired that the acid value is at least 30, preferably at least 50. In order to prevent final water resistance of the water-based pigment dispersion from lowering, it is desired that the acid value is at most 300, preferably at most 250.

The pigment used in the present invention is not particularly limited. Various organic pigments and various inorganic pigments can be used.

Typical examples of the pigment are, for instance, various organic pigments such as an azo pigment such as azolake, insoluble monoazo pigment, insoluble disazo pigment or chelate azo pigment, and a polycyclic pigment such as phthalocyanine pigment, perylene pigment, perinone pigment, anthraquinone pigment, quinacridone pigment, dioxadine pigment, thioindigo pigment, isoindolinone pigment, quinophthalone pigment, diketo-pyrrolo-pyrrole pigment, benzimidazolone pigment or thren pigment; various inorganic pigments such as an oxide such as titanium dioxide, iron oxide, red iron oxide or chromium oxide; carbon black; fluorescence pigment; nacreous pigment; and the like. These can be used alone or in admixture thereof.

Concrete examples of the organic pigment are, for instance, Pigment yellow 1 (Color Index (hereinafter referred to as "C.I.") 11680), Pigment yellow 3 (C.I.11710), Pigment yellow 14 (C.I.21095), Pigment yellow 42 (C.I.77492), Pigment yellow 74 (C.I.11741), Pigment yellow 83 (C.I.21108), Pigment yellow 106, Pigment yellow 108 (C.I.68240), Pigment yellow 117, Pigment yellow 126, Pigment yellow 139, Pigment yellow 185, Pigment orange 5 (C.I.12075), Pigment orange 67, Pigment red 3 (C.I.12120), Pigment red 22 (C.I.12315), Pigment red 48:1 (C.I.15865:1), Pigment red 48:4 (C.I.15865:4), Pigment red 101 (C.I.77491), Pigment red 112 (C.I.12370), Pigment red 123 (C.I.71145), Pigment red 169 (C.I.45160:2), Pigment violet 23 (C.I.51319), Pigment violet 27 (C.I.42555:3), Pigment blue 1 (C.I.42595:2), Pigment blue 15:1 (C.I.74160), Pigment blue 15:3 (C.I.74160), Pigment blue 15:6 (C.I.74160), Pigment blue 61 (C.I.42765:1), Pigment green 7 (C.I.74260), Pigment green 36 (C.I.74265) and the like.

Concrete examples of the inorganic pigment are, for instance, Pigment yellow 42 (C.I.77492), Pigment white 6 (C.I.77891), Pigment blue 27 (C.I.77510), Pigment blue 29 (C.I.77007), Pigment black 7 (C.I.77266) and the like.

In the present invention, because particle size easily becomes small and specific gravity is small, the organic pigment is preferably used in consideration of stability. There is no limitation as to form of the pigment. Various surface-treated pigments, powder and water-based paste can be applied. In consideration of dispersing property, it is preferred that primary particle size of the pigment is, in general, at most about 0.1 g m.

In consideration of the resin amount for greatest effects for dispersion of the pigment and for prevention of higher cost because of low effects in spite of excess amount, it is desired that the ratio of the pigment to the thermoplastic resin (pigment/thermoplastic resin (weight ratio of effective solid matter)) is at least 10/10, preferably at least 10/7. In consideration of the requisite resin amount for dispersion of the pigment, it is desired that the ratio of the pigment to the thermoplastic resin (pigment/thermoplastic resin (weight ratio of effective solid matter)) is at most 10/1, preferably at most 10/1.5.

In the process of the present invention, as the first step (1), the pigment and the thermoplastic resin are predispersed to give a mixture.

In general, after a pigment and a dispersant are prestirred in a solvent, these are subjected to dispersion. The prestir exhibits effects for improving wettability of the pigment with the dispersant. However, the prestir is insufficient for preparing small particles in the next dispersion step. Accordingly, it is considered that predispersion step is more required than the prestir step. That is, in the present invention, the pigment and the thermoplastic resin are predispersed in order to effectively grind coarse large particles and to give uniform fine particles in the next dispersion step in addition to exhibit mixing and wetting effect of the pigment with the thermoplastic resin.

The predispersion of the pigment and the thermoplastic resin can be carried out, for instance, by using a pore-shearing type mixer.

The pore-shearing type mixer has a structure for larger shearing between each stirring blade, and between the stirring blade and a container. The pore-shearing type mixer is suitable for high viscous material. Concrete examples of the pore-shearing type mixer are, for instance, kneader, planetary mixer, butterfly mixer and the like.

Temperature and time for predispersion are not particularly limited. For instance, according to the kind of the pigment and the thermoplastic resin, temperature and time for predispersion may be adjusted so that the pigment and the thermoplastic resin are sufficiently predispersed.

In the present invention, it is preferable that the thermoplastic resin is neutralized with an organic amine having boiling point of at most 200° C. before predispersion in the first step (1), or from after predispersion to before treatment of the mixture by a dispersing machine in the second step (2).

The thermoplastic resin is neutralized with the organic amine in water-based system. The thermoplastic resin is neutralized, there is an advantage that dispersing ability of the thermoplastic resin is considerably improved. For instance, in consideration that the organic amine is removed during cross-linking reaction, in order to remove fear of difficulty of distillation, it is desired that an organic amine having boiling point of at most 200° C., preferably at most 180° C. is used.

Concrete examples of the organic amine are, for instance, ammonia, monoethylamine, diethylamine, triethylamine, diisopropylamine, isopropylamine, monoethanolamine, 2-amino-2-methylpropanol, morpholine, N,N-dimethylethanolamine, N-methylethanolamine and the like. These can be used alone or in admixture thereof.

The amount of the organic amine is not particularly limited. For instance, it is preferable that the amount of the organic amine is adjusted so that neutralization rate of the thermoplastic resin is 100 to 150% or so. Temperature and time for neutralization are not particularly limited. It is preferable that temperature and time for neutralization are suitably adjusted according to the kind of the thermoplastic resin and the organic amine.

As the second step (2), the thus predispersed mixture is treated by a dispersing machine and the pigment is dispersed with the thermoplastic resin to give a dispersion.

The above mixture is treated in water-based system. Examples of the dispersing machine for treatment of the mixture are, for instance, a media type dispersing machine, a collision type dispersing machine and the like.

The media type dispersing machine is as the following dispersing machine. That is, by using this dispersing machine, media having small size, such as glass, alumina, zirconia, steel or tungsten are moved at high speed in a vessel, and slurry passing through the media is ground with shearing power between media. Concrete examples of the media type dispersing machine are, for instance, ball mill, sand mill, pearl mill, agitator mill, coball mill, ultravisco mill, spike mill, ultrafine mill and the like.

The collision type dispersing machine is as the following dispersing machine. That is, by using this dispersing machine, fluid collides with one wall at high speed or each fluid collides with each other at high speed, so that the pigment in fluid is ground. Concrete examples of the collision type dispersing machine are, for instance, nanomizer, homogenizer, microfluidizer, ultimaizer and the like.

In the present invention, in addition to the above dispersing machines, well known dispersing machines such as roll mill and ultrasonic dispersing machine can be used for preparation of the dispersion.

Temperature and time for treatment of the mixture by using the dispersing machine are not particularly limited. For instance, according to the kind of the pigment and the thermoplastic resin, temperature and time for treatment are adjusted so that the pigment is sufficiently finely dispersed with the thermoplastic resin.

In the present invention, in order to more improve dispersing ability and wettability of the pigment, as occasion demands, a resin other than the thermoplastic resin and a surface active agent can be added to the mixture during dispersion of the pigment with the thermoplastic resin.

Examples of the resin other than the thermoplastic resin are, for instance, aqueous resins such as a natural high molecular compound such as carboxymethyl cellulose, hydroxyethyl cellulose, alginic acid and a salt thereof, guar gum or gelatin; a synthetic high molecular compound such as polyacrylamide or polyvinyl alcohol; and a thermosetting acrylic resin. It is desired that the amount of the resin is 1 to 15% by weight or so, preferably 2 to 10% by weight or so of the mixture after predispersion.

Examples of the surface active agent are, for instance, an anionic surface active agent such as alkylbenzene sulfonic acid salt, salt of higher alcohol and sulfate, higher fatty acid salt, higher alkyldicarboxylic acid salt, alkylnaphthalene sulfonic acid salt, alkylsulfosuccinic acid salt, condensation salt of naphthalene sulfonic acid and formalin, salt of polyoxyethylene alkylether and sulfuric acid or polyoxyethylene alkylphosphate; a nonionic surface active agent such as polyoxyethylene alkylether, polyoxyethylene alkylphenylether, fatty acid monoglyceride, sorbitane fatty acid ester, polyoxyethylene fatty acid ester, polyglycerine fatty acid ester or polyoxyethylene-addition acetylene glycol; and a cationic surface active agent such as aliphatic amine salt, aliphatic phosphonium salt or aliphatic sulfonium salt; and the like. It is desired that the amount of the surface active agent is 1 to 20% by weight or so, preferably 2 to 15% by weight or so of the mixture after predispersion.

When an aqueous organic solvent having higher boiling point is used during dispersion, drying can be prevented, and wettability with the pigment and storage stability can be improved.

Concrete examples of the aqueous organic solvent having higher boiling point are, for instance, monoethylene glycol, diethylene glycol, triethylene glycol, propylene glycol, hexylene glycol, glycerin, 1,3-butanediol, polyglycerin, thiodiglycol, polyethylene glycol, N-methyl-2-pyrrolidone, 1,3-dimethyl-2-imidazolydinone, monoethylene glycol monomethyl ether, diethylene glycol monoethyl ether, diethylene glycol monobutyl ether, triethylene glycol monoethyl ether, triethylene glycol monobutyl ether and the like. Examples of the aqueous organic solvent having higher boiling point are not limited to the above. It is desired that the amount of the aqueous organic solvent having higher boiling point is 3 to 30% by weight or so, preferably 5 to 15% by weight or so of the mixture after predispersion.

In addition, general additives such as an antiseptic and rust inhibition agent such as methyl benzoate, sodium dehydroacetate or 1,2-benzothiazoline-3-one; a pH-adjuster such as potassium dihydrophosphate; emulsion; a viscosity-adjuster and a defoaming agent can be suitably added to the mixture during dispersion of the pigment with the thermoplastic resin.

As the third step (3), the thermoplastic resin in the dispersion prepared by dispersing the pigment with the thermoplastic resin is cross-linked with a cross-linking agent.

As to the dispersion, pH at finishing cross-linking reaction is adjusted within the range from 6.0 to 8.0. The reasons for adjusting pH at finishing cross-linking reaction are as follows: When pH is more than 8.0, cross-linking reaction of the thermoplastic resin cannot sufficiently proceed and a water-based pigment dispersion showing excellent properties such as water resistance, alkali resistance and solvent resistance cannot be obtained. When pH is less than 6.0, dissolved thermoplastic resin precipitates. It is preferable that pH of the dispersion is at most 7.8 and at least 6.3.

When the thermoplastic resin is neutralized with the organic amine having boiling point of at most 200° C., example of a process for adjusting pH of the dispersion at finishing cross-linking reaction to the range from 6.0 to 8.0 is, for instance, a method in which the amount of the organic amine is previously adjusted or the organic amine is removed. Also, a method in which the dispersion is treated with an acidic compound can be employed.

Removal of the organic amine can be carried out by an evaporator. When excessive organic amine during neutralization is removed, hindrance to cross-linking reaction of the thermoplastic resin can be prevented.

Examples of the acidic compound are, for instance, an inorganic acid such as hydrochloric acid, sulfuric acid or nitric acid; a lower organic acid such as acetic acid, butyric acid, lactic acid or malic acid; an ether type or ester type organic compound such as higher fatty acid, benzenesulfonic acid, ester of higher alcohol and sulfuric acid, higher alkyldicarboxylic acid, alkylnaphthalene sulfonic acid, alkylsulfosuccinic acid, polyoxyethylene alkylsulfuric acid ether or polyoxyethylene alkylphosphoric acid; and the like. These can be suitably selected and used according to the kind of the thermoplastic resin. The amount of the acidic compound is not particularly limited. The amount can be suitably adjusted so that pH of the dispersion at finishing cross-linking reaction is adjusted within the range from 6.0 to 8.0.

In general, examples of a curing process of a carboxylic group-containing thermoplastic resin which is used for coating material or printing ink are a process in which moisture, solvents and organic amines scatter under the condition of heating, and functional groups start curing reaction at the same time; and a process in which moisture, solvents and organic amines scatter under the condition of heating, and polymerization curing occurs based on radical source such as organic amines at the same time. In both processes, cross-linking proceeds at three-dimension, so that strong film is formed.

In the present invention, the resin cures with maintaining function as a dispersant without adsorption and aggregation of the pigment particles with each other in water-based system. In addition, stability is given. That is, not functional groups in the resin are perfectly reacted, but it is necessitated that essential functional groups for maintaining the dissolved state of the resin own, carboxylic groups, remain after cross-linking.

One of the important elements is that control for the essential functional groups is examined by utilizing pH of the dispersion at finishing cross-linking reaction.

In the present invention, the thermoplastic resin is cross-linked after the pigment is dispersed with the thermoplastic resin. Accordingly, the water-based pigment dispersion showing high dispersing effect, having small particle size and being excellent in stability during the passage of time can be obtained with differing from conventional dispersion of the pigment with a previously cross-linked resin.

Because the dispersion is water-based, it is preferable that a cross-linking agent used for cross-linking of the thermoplastic resin is an aqueous polymer or an aqueous oligomer from the viewpoint of easiness of use.

It is preferable that the aqueous polymer contains carboxylic group as a reaction point for cross-linking and is crosslinkable at lower temperature. Typical examples of the aqueous polymer are, for instance, polycarbodiimide type aqueous polymer, oxazoline type aqueous polymer, polyethyleneimine type aqueous polymer and the like.

It is preferable that the aqueous oligomer contains (meth) acryloyl group and is crosslinkable at lower temperature. Typical examples of the aqueous oligomer are, for instance, oligoester (meth)acrylate mainly having ester bond, urethane (meth)acrylate having urethane bond, epoxy (meth) acrylate having main bone of epoxy resin and the like.

In order to sufficiently proceed cross-linking reaction, the ratio of the cross-linking agent to the thermoplastic resin (cross-linking agent/thermoplastic resin (weight ratio of effective solid matter)) is at least 1/100, preferably at least 2/100. In order to remove fears that cross-linking effect cannot be improved and that quality of the water-based pigment dispersion is lowered due to excessive cross-linking agent, the ratio of the cross-linking agent to the thermoplastic resin (cross-linking agent/thermoplastic resin (weight ratio of effective solid matter)) is at most 50/100, preferably at most 45/100.

Temperature and time for cross-linking the thermoplastic resin are not particularly limited. For instance, temperature and time for cross-linking are suitably adjusted according to the kind of the thermoplastic resin and the cross-linking agent. Cross-linking rate of the thermoplastic resin in the dispersion is effected by additives in water-based system. In consideration that carboxylic group in the resin reacts at equivalent mole, it is preferable that cross-linking rate is 20 to 100% or so.

From the viewpoint that excellent physical properties such as alkali resistance and solvent resistance can be exhibited, it is desired that gel percent of the cross-linked thermoplastic resin is at least 30%, preferably at least 35%. The upper limit of gel percent is 100%. Higher gel percent is more preferable.

In general, gel percent is a standard for cross-linking degree of the resin. In the present invention, the water-based pigment dispersion was powdered and dried, and the eluted amount of the resin was measured with tetrahydrofuran as a solvent. So that, gel percent was calculated in accordance with this measured value.

From the viewpoint that properties of the aimed water-based pigment dispersion are sufficiently improved, it is desired that number average molecular weight of the cross-linked thermoplastic resin is more than 100000, preferably at least 200000. Higher number average molecular weight is more preferable.

The thermoplastic resin is cross-linked, so that a dispersion containing the pigment and the cross-linked thermoplastic resin can be obtained. From the viewpoint that stability during the passage of time is improved for a long period of time, it is preferable that the cross-linked thermoplastic resin is strongly adsorbed on the pigment.

As the fourth step (4), pH of the dispersion containing the pigment and the cross-linked thermoplastic resin is adjusted to alkaline range to give the water-based pigment dispersion of the present invention.

In order to improve stability during the passage of time of the water-based pigment dispersion, pH of the dispersion is adjusted to alkaline range.

For adjusting pH of the dispersion to alkaline range, for instance, an alkalizing agent can be used. The alkalizing agent is not particularly limited. As the alkalizing agent, for instance, an organic amine such as ammonia, monoethanolamine, diethanolamine, triethanolamine, triethylamine, diethylamine, N,N-dimethylethanolamine, N,N-diethylethanolamine, 2-dimethylamino-2-methyl-1-propanol, monoisopropanolamine, diisopropanolamine, triisopropanolamine, N-ethyldiethanolamine, N-methyldiethanolamine or morpholine; an alkali metal salt such as sodium hydroxide, potassium hydroxide or lithium hydroxide; and the like are utilized.

The amount of the alkalizing agent is not particularly limited. In order to adjust pH of the water-based pigment dispersion to alkaline range of at least 8, preferably 8.5 to 10 or so, it is preferable that the amount of the alkalizing agent is 0.1 to 0.5% by weight or so of the dispersion.

Temperature and time for adjusting pH of the dispersion to alkaline range are not particularly limited. For instance, temperature and time for adjusting pH are suitably adjusted according to the kind of the pigment and the cross-linked thermoplastic resin contained in the dispersion and the kind of the alkalizing agent.

The water-based pigment dispersion is subjected to centrifugal separation or filter treatment, and coarse large particles are removed. As a result, quality of the water-based pigment dispersion can be more improved.

In consideration that excellent stability during the passage of time can be exhibited, it is desired that average particle size of the dispersed pigment in the water-based pigment dispersion of the present invention is at most 200 nm, preferably at most 170 nm.

In consideration that precipitation hardly occurs and excellent stability during the passage of time can be exhibited, it is desired that the water-based pigment dispersion of the present invention has the absorbancy ratio calculated in accordance with the following equation (I):

$$\text{Absorbancy ratio} = \frac{\text{Absorbancy of supernatant liquid after centrifugal treatment}}{\text{Absorbancy before centrifugal treatment}} \times 100 \quad (I)$$

of at least 10, preferably at least 15, and at most 100. As to the above Absorbancy ratio, centrifugal treatment of the water-based pigment dispersion of the present invention is carried out under the condition of 8000 revolution/5 min. and 10000 G. Also, the absorbancy is a measured value of top peak in a diluted solution prepared by diluting 1 g of the pigment amount with 5 L of ion-exchange water.

The solid matter concentration of the water-based pigment dispersion of the present invention is, in general, 5 to 40% by weight or so.

In accordance with the process of the present invention, the water-based pigment dispersion showing excellent light resistance, water resistance, alkali resistance and solvent resistance, and in addition, showing excellent stability during the passage of time can be easily prepared.

Because the water-based pigment dispersion of the present invention has the above excellent physical properties at the same time, the dispersion can be suitably used for coating materials; paper coating; textile printing; water-based ink such as writing ink, printing ink or ink-jet printing ink; color filters; cosmetic materials such as eyeliner; and recording materials such as electrophotographic toner.

The water-based ink of the present invention contains the above water-based pigment dispersion.

In order to clearly fulfill function as a coloring agent, it is desired that the content of the water-based pigment dispersion in the water-based ink is at least 5% by weight, preferably at least 10% by weight, as 20% by weight of solid matter concentration. In order to prevent viscosity of the water-based ink from too increasing and in consideration of the addition of the other additives mentioned later to the water-based ink, it is desired that the content of the water-based pigment dispersion in the water-based ink is at most 70% by weight, preferably at most 60% by weight, as 20% by weight of solid matter concentration.

In addition to the above water-based pigment dispersion, the water-based ink of the present invention can contain various solvents and other additives which are usually contained in the general water-based ink. Examples of the solvents and the other additives are, for instance, a water-based type solvent such as ion-exchange water; an organic solvent such as monoethylene glycol, diethylene glycol, triethylene glycol, polyethylene glycol, glycerin, polyglycerin, propylene glycol, 1,3-butanediol, thiodiglycol, N-methyl-2-pyrrolidone, monoethylene glycol monomethyl ether, diethylene glycol monoethyl ether or triethylene glycol monoethyl ether; and the additives such as a sugar such as glucose, galactose, maltitol or cyclodextrin; an antiseptic and rust inhibition agent such as methyl benzoate, sodium dehydroacetate or 1,2-benzothiazoline-3-one; a pH-adjuster such as potassium dihydrophosphate; a viscosity-adjuster such as polyvinyl alcohol or methyl cellulose; a defoaming agent such as a silicone compound; or emulsion. The amount of the water-based type solvent, organic solvent and additives can be suitably adjusted so that the total amount of the water-based pigment dispersion and these reaches 100% by weight.

A process for preparing the water-based ink of the present invention is not particularly limited. For instance, the water-based pigment dispersion, and the water-based type solvent, organic solvent and additives which are used as occasion demands are uniformly stirred and admixed with each other.

The water-based ink of the present invention has the above excellent physical properties at the same time and can be suitably used for writing ink, printing ink and ink-jet printing ink.

The water-based pigment dispersion, the process for preparing the same and the water-based ink containing the same of the present invention will be more specifically explained on the basis of Examples. However, the scope of the present invention is not limited to only the Examples.

EXAMPLE 1

[Predispersion Step]

The following components were prepared and predispersed by kneading in a kneader at room temperature for 1 hour to give a mixture.

| Component | Amount (Part(s) by weight) (hereinafter referred to as "Part(s)") |
|---|---|
| Yellow pigment (Pigment yellow 14 (C.I.21095)) | 65 |
| Styrene-acrylic acid copolymer (styrene/acrylic acid (weight ratio) = 88/12, acid value: 94, number average molecular weight: 12000) | 30 |
| Ethylene glycol | 5 |

Then, 5 parts of 25% ammonia water and 370 parts of ion-exchange water were added to the mixture. These were stirred at 80° C. for 3 hours, so that the styrene-acrylic acid copolymer was neutralized and dissolved (neutralization rate: about 150%).

[Dispersion Step]

The thus predispersed and neutralized mixture was subjected to three-pass treatment in a sand mill which was filled with glass beads having a diameter of 0.7 mm in a volume of 80%. As a result, the yellow pigment was finely dispersed with the styrene-acrylic acid copolymer to give a dispersion.

Then, part of ammonia in the above dispersion was removed by an evaporator and pH of the dispersion was adjusted to 7.0.

[Cross-Linking Treatment Step]

To the above dispersion having pH of 7.0 was added 5 parts of 30% aqueous carbodiimide resin (carbodiimide equivalent: 300), and these were stirred at 90° C. for 5 hours. As a result, the styrene-acrylic acid copolymer in the dispersion was cross-linked (gel percent of cross-linked styrene-acrylic acid copolymer: 40%, number average molecular weight of cross-linked styrene-acrylic acid copolymer: 500000). Then, the cross-linked styrene-acrylic acid copolymer was strongly adsorbed on the yellow pigment. The pH of the dispersion at finishing cross-linking reaction was 6.8.

[Adjust Step of pH]

To the dispersion containing the yellow pigment and the cross-linked styrene-acrylic acid copolymer strongly adsorbed thereon was added triethanolamine in an amount of 0.3% by weight, so that pH of the dispersion was adjusted to 8.7.

The dispersion was subjected to centrifugal separation at 25000 G for 5 minutes, and coarse large particles were removed. As a result, a yellow water-based pigment dispersion having solid matter concentration of 20% by weight was prepared.

The average particle size of pigment in the yellow water-based pigment dispersion was 130 nm and absorbancy ratio calculated in accordance with the above equation (I) was 30.

Then, 105 parts of the above yellow water-based pigment dispersion, 35 parts of diethylene glycol and 110 parts of ion-exchange water were admixed and stirred with each other to give a yellow water-based ink for writing. By using the water-based ink, writing test was carried out. As a result, the water-based ink was excellent in efflux property from the point of pen and dry-up property. Also, by using the water-based ink, drawing test was carried out. As a result, it became no scratchy during drawing for 500 m.

As to the water-based pigment dispersion, light resistance, water resistance, alkali resistance, solvent resistance and stability during the passage of time were examined in accordance with the following methods. The results are shown in TABLE 1.

(i) Light Resistance Test

The water-based pigment dispersion was coated on Kent paper by a barcoater No. 10, and the Kent paper was dried at 120° C. for 10 minutes to give a test piece.

The test piece was irradiated with ultraviolet ray for 300 hours by using a carbon arc-fade meter, and color difference (ΔE) was measured by using CCM (ACS-2018 Model 55SX, made by ACS Company). Then, degree of color tone change was examined.

When the color difference is less than 3.0, light resistance is excellent.

(ii) Water Resistance Test

Using the same test piece as in (i) Light resistance Test, the test piece was immersed in water for 1 minute and existence of elution of the pigment was examined.

In TABLE 1, when there is no elution at all, the mark is "○". When there is even a little elution, the mark is "X".

(iii) Alkali Resistance Test

Using the same test piece as in (i) Light resistance Test, the test piece was immersed in 1% sodium hydroxide solution for 1 minute and existence of elution of the pigment was examined.

In TABLE 1, when there is no elution at all, the mark is "○". When there is even a little elution, the mark is "X".

(iv) Solvent Resistance Test

Using the same test piece as in (i) Light resistance Test, the test piece was immersed in 10% methyl ethyl ketone solution for 1 minute and existence of elution of the pigment was examined.

In TABLE 1, when there is no elution at all, the mark is "○". When there is even a little elution, the mark is "X".

(v) Stability During the Passage of Time

After the water-based pigment dispersion was allowed to stand in a thermostated room at 20° C. for 1 month, existence of separation of the pigment, water-floating and precipitation was examined. When there is even a little separation of the pigment, water-floating or precipitation, the evaluation is unusual.

In TABLE 1, when the evaluation is not unusual, the mark is "○". When the evaluation is unusual, the mark is "X".

COMPARATIVE EXAMPLE 1

A yellow water-based pigment dispersion was prepared in the same manner as in EXAMPLE 1 except that an aqueous epoxy resin not containing carboxyl group was used instead of the styrene-acrylic acid copolymer, and triethanolamine was added to a dispersion having pH of 7.0 without Cross-linking treatment Step.

As to the water-based pigment dispersion, light resistance, water resistance, alkali resistance, solvent resistance and stability during the passage of time were examined in the same manner as in EXAMPLE 1. The results are shown in TABLE 1.

EXAMPLE 2

[Predispersion Step]

The following components were prepared and predispersed by kneading in a kneader at room temperature for 1 hour to give a mixture.

| Component | Amount (Part(s)) |
| --- | --- |
| Red pigment | 70 |
| (Pigment red 22 (C.I.12315)) | |
| Styrene-α-methylstyrene-acrylic acid copolymer | 28 |
| (styrene/α-methylstyrene/acrylic acid | |
| (weight ratio) = 40/30/30, acid value: 234, | |
| number average molecular weight: 9000) | |
| Glycerin | 2 |

Then, 12 parts of triethylamine and 345 parts of ion-exchange water were added to the mixture. These were stirred at 70° C. for 3 hours, so that the styrene-α-methylstyrene-acrylic acid copolymer was neutralized and dissolved (neutralization rate: about 100%).

[Dispersion Step]

The thus predispersed and neutralized mixture was subjected to three-pass treatment in a sand mill which was filled with zirconia beads having a diameter of 0.5 mm in a volume of 80%. As a result, the red pigment was finely dispersed with the styrene-α- methylstyrene-acrylic acid copolymer to give a dispersion.

Then, 1.5 parts of polyoxyethylene alkylphosphate was added to the above dispersion and pH of the dispersion was adjusted to 6.5.

[Cross-Linking Treatment Step]

To the above dispersion having pH of 6.5 was added 5 parts of 30% aqueous carbodiimide resin (carbodiimide equivalent: 300), and these were stirred at 80° C. for 7 hours. As a result, the styrene-α -methylstyrene-acrylic acid copolymer in the dispersion was cross-linked (gel percent of cross-linked styrene-α-methylstyrene-acrylic acid copolymer: 70%, number average molecular weight of cross-linked styrene-α-methylstyrene-acrylic acid copolymer: 800000). Then, the cross-linked styrene-α-methylstyrene-acrylic acid copolymer was strongly adsorbed on the red pigment. The pH of the dispersion at finishing cross-linking reaction was 6.4.

[Adjust Step of pH]

To the dispersion containing the red pigment and the cross-linked styrene-α-methylstyrene-acrylic acid copolymer strongly adsorbed thereon was added ammonia water in an amount of 0.5% by weight, so that pH of the dispersion was adjusted to 9.2.

The dispersion was subjected to centrifugal separation at 25000 G for 5 minutes, and coarse large particles were removed. As a result, a red water-based pigment dispersion having solid matter concentration of 20% by weight was prepared.

The average particle size of pigment in the red water-based pigment dispersion was 163 nm and absorbancy ratio calculated in accordance with the above equation (I) was 55.

Then, 10 parts of the above red water-based pigment dispersion, 80 parts of textile printing paste (mineral turpentine emulsion) and 10 parts of an adhering agent (acrylic emulsion) were admixed and stirred with each other to give a mixture. The mixture was subjected to printing by a silkscreen method. As a result, there was no clogging in the screen by pigment.

As to the water-based pigment dispersion, light resistance, water resistance, alkali resistance, solvent resistance and stability during the passage of time were examined in the same manner as in EXAMPLE 1. The results are shown in TABLE 1.

COMPARATIVE EXAMPLE 2

A red water-based pigment dispersion was prepared in the same manner as in EXAMPLE 2 except that the three-pass treatment was carried out by using a sand mill without adjust of pH before Cross-linking treatment Step to give a dispersion, and the carbodiimide resin was directly added to the dispersion, and pH of the dispersion at finishing cross-linking reaction was 8.2.

As to the water-based pigment dispersion, light resistance, water resistance, alkali resistance, solvent resistance and stability during the passage of time were examined in the same manner as in EXAMPLE 1. The results are shown in TABLE 1.

EXAMPLE 3

[Predispersion Step]

The following components were prepared and predispersed by kneading in a butterfly mixer at room temperature for 5 hours to give a mixture.

| Component | Amount (Part(s)) |
| --- | --- |
| Blue pigment | 40.0 |
| (Pigment blue 15:1 (C.I.74160)) | |
| Styrene-maleic acid copolymer | 7.0 |
| (styrene/maleic acid (weight ratio) = 60/40, | |
| acid value: 190, | |
| number average molecular weight: 3000) | |
| Ethylene glycol | 5.0 |
| Diethylamine | 2.5 |
| Ion-exchange water | 45.5 |

Then, 150 parts of ion-exchange water was added to the mixture. These were stirred for 30 minutes, so that the styrene-maleic acid copolymer was neutralized and dissolved (neutralization rate: about 120%).

[Dispersion Step]

The thus predispersed and neutralized mixture was subjected to five-pass treatment in a sand mill which was filled with glass beads having a diameter of 1.0 mm in a volume of 80%. As a result, the blue pigment was finely dispersed with the styrene-maleic acid copolymer to give a dispersion.

Then, part of morpholine in the above dispersion was removed by an evaporator and pH of the dispersion was adjusted to 7.2.

[Cross-Linking Treatment Step]

To the above dispersion having pH of 7.2 was added 5 parts of 35% aqueous oxazoline group-containing resin (oxazoline equivalent: 200), and these were stirred at 90° C. for 3.5 hours. As a result, the styrene-maleic acid copolymer in the dispersion was cross-linked (gel percent of cross-linked styrene-maleic acid copolymer: 50%, number average molecular weight of cross-linked styrene-maleic acid copolymer: 550000). Then, the cross-linked styrene-maleic acid copolymer was strongly adsorbed on the blue pigment. The pH of the dispersion at finishing cross-linking reaction was 7.0.

[Adjust Step of pH]

To the dispersion containing the blue pigment and the cross-linked styrene-maleic acid copolymer strongly adsorbed thereon was added N-methyl-diethanolamine in an amount of 0.3% by weight, so that pH of the dispersion was adjusted to 9.5.

The dispersion was subjected to centrifugal separation at 25000 G for 5 minutes and coarse large particles were removed. As a result, a blue water-based pigment dispersion having solid matter concentration of 20% by weight was prepared.

The average particle size of pigment in the blue water-based pigment dispersion was 138 nm and absorbancy ratio calculated in accordance with the above equation (I) was 43.

Then, 20 parts of the above blue water-based pigment dispersion, 15 parts of ordinary dry-type acrylic resin (solid matter content: 45% by weight) and 150 parts of ion-exchange water were admixed and stirred with each other to give a blue water-based coating material. After the water-based coating material was coated on a slate, the coated slate was dried at 120° C. for 10 minutes to give a coating film. There were no peeling and flaking on the coating film, and the coating film showed high coloring and excellent surface gloss.

As to the water-based pigment dispersion, light resistance, water resistance, alkali resistance, solvent resistance and stability during the passage of time were examined in the same manner as in EXAMPLE 1. The results are shown in TABLE 1.

COMPARATIVE EXAMPLE 3

A blue water-based pigment dispersion was prepared in the same manner as in EXAMPLE 3 except that each of components was admixed without Predispersion Step in a butterfly mixer to give a mixture.

As to the water-based pigment dispersion, light resistance, water resistance, alkali resistance, solvent resistance and stability during the passage of time were examined in the same manner as in EXAMPLE 1. The results are shown in TABLE 1.

EXAMPLE 4

[Predispersion Step]

The following components were prepared and predispersed by kneading in a butterfly mixer at room temperature for 4 hours to give a mixture.

| Component | Amount (Part(s)) |
|---|---|
| Green pigment (Pigment green 7 (C.I.74260)) | 35.0 |
| Styrene-methacrylic acid copolymer (styrene/methacrylic acid (weight ratio) = 78/22, acid value: 170, number average molecular weight: 85000) | 8.5 |
| Diethylene glycol | 10.0 |
| Isopropylamine | 2.0 |

Ion-Exchange Water 43.5

Then, 110 parts of ion-exchange water was added to the mixture. These were stirred for 30 minutes, so that the styrene-methacrylic acid copolymer was neutralized and dissolved (neutralization rate: about 130%).

[Dispersion Step]

The thus predispersed and neutralized mixture was subjected to three-pass treatment in a sand mill which was filled with zirconia beads having a diameter of 0.5 mm in a volume of 80%. As a result, the green pigment was finely dispersed with the styrene-methacrylic acid copolymer to give a dispersion (pH: 8.2).

[Cross-Linking Treatment Step]

To the above dispersion having pH of 8.2 was added 5 parts of 100% aqueous polyoxyethylene oligoester acrylate (difunctionality in a molecule), and these were stirred at 85° C. for 8 hours. As a result, the styrene-methacrylic acid copolymer in the dispersion was cross-linked (gel percent of cross-linked styrene-methacrylic acid copolymer: 60%, number average molecular weight of cross-linked styrene-methacrylic acid copolymer: 700000). Then, the cross-linked styrene-methacrylic acid copolymer was strongly adsorbed on the green pigment. The pH of the dispersion at finishing cross-linking reaction was 7.5.

[Adjust Step of pH]

To the dispersion containing the green pigment and the cross-linked styrene-methacrylic acid copolymer strongly adsorbed thereon was added triethanolamine in an amount of 0.3% by weight, so that pH of the dispersion was adjusted to 9.1.

The dispersion was subjected to centrifugal separation at 25000 G for 5 minutes and coarse large particles were removed. As a result, a green water-based pigment dispersion having solid matter concentration of 20% by weight was prepared.

The average particle size of pigment in the green water-based pigment dispersion was 117 nm and absorbancy ratio calculated in accordance with the above equation (I) was 37.

Then, 20 parts of the above green water-based pigment dispersion, 75 parts of 5% gelatin aqueous solution, 5 parts of a photo polymerizable unsaturated acrylic resin, 0.2 part of acetophenone as a photo polymerization initiator and 40 parts of ion-exchange water were admixed and stirred with each other to give a mixture. The mixture was coated on a glass plate by a spin coater, and the coated glass plate was dried to give a coating film. The dried coating film was exposed to light and then, the exposed coating film was baked to give a color filter. The color filter was clear and excellent in transparency.

As to the water-based pigment dispersion, light resistance, water resistance, alkali resistance, solvent resistance and stability during the passage of time were examined in the same manner as in EXAMPLE 1. The results are shown in TABLE 1.

COMPARATIVE EXAMPLE 4

A green water-based pigment dispersion was prepared in the same manner as in EXAMPLE 4 except that the dispersion containing the green pigment and the cross-linked styrene-methacrylic acid copolymer strongly adsorbed thereon, and having pH of 7.0 was directly subjected to centrifugal separation without Adjust Step of pH.

As to the water-based pigment dispersion, light resistance, water resistance, alkali resistance, solvent resistance and stability during the passage of time were examined in the same manner as in EXAMPLE 1. The results are shown in TABLE 1.

TABLE 1

Physical property of water-based pigment dispersion

| | Light resistance (Color difference (ΔE)) | Water resistance | Alkali resistance | Solvent resistance | Stability during the passage of time |
|---|---|---|---|---|---|
| Ex. No. | | | | | |
| 1 | 1.9 | ○ | ○ | ○ | ○ |
| 2 | 2.2 | ○ | ○ | ○ | ○ |
| 3 | 0.5 | ○ | ○ | ○ | ○ |
| 4 | 0.3 | ○ | ○ | ○ | ○ |
| Com. Ex. | | | | | |
| 1 | 3.5 | X | X | X | ○ |
| 2 | 2.4 | ○ | X | X | ○ |
| 3 | 0.6 | ○ | ○ | ○ | X |
| 4 | 0.3 | ○ | ○ | ○ | X |

From the results shown in TABLE 1, it can be understood that the water-based pigment dispersions prepared in EXAMPLES 1 to 4 in accordance with the process of the present invention show excellent light resistance, water resistance, alkali resistance and solvent resistance, and in addition, excellent stability during the passage of time.

To the contrary, it can be understood that the water-based pigment dispersions prepared in COMPARATIVE EXAMPLES 1 to 4 without some steps in the process of the present invention show at least bad one of water resistance, alkali resistance, solvent resistance and stability during the passage of time, so the dispersions not show excellent properties at the same time.

INDUSTRIAL APPLICABILITY

In accordance with the process of the present invention, the water-based pigment dispersion showing excellent light resistance, water resistance, alkali resistance and solvent resistance, and in addition, excellent stability during the passage of time can be easily prepared.

Because the water-based pigment dispersion of the present invention has the above excellent physical properties at the same time, the dispersion can be suitably used for coating materials; paper coating; textile printing; water-based ink such as writing ink, printing ink or ink-jet printing ink; color filters; cosmetic materials such as eyeliner; and recording materials such as electrophotographic toner.

The water-based ink of the present invention shows excellent physical properties based on the above water-based pigment dispersion at the same time.

What is claimed is:

1. A water-based pigment dispersion comprising:
   a pigment and a cross-linked thermoplastic resin containing carboxylic group,
   wherein said pigment is dispersed with a water soluble or self-emulsifying thermoplastic resin containing carboxylic group and, after said pigment is dispersed, said water soluble or self-emulsifying thermoplastic resin is cross-linked with a cross-linking agent to form said cross-linked thermoplastic resin containing carboxylic group under the condition that the dispersion obtained after the completion of the cross-linking has a pH of 6.0 to 7.8,
   in which the ratio of said pigment to said water soluble or self-emulsifying thermoplastic resin (pigment/thermoplastic resin (weight ratio of effective solid matter)) is 10/10 to 10/1, and
   the ratio of said cross-linking agent to said water soluble or self-emulsifying thermoplastic resin (cross-linking agent/thermoplastic resin (weight ratio of effective solid matter)) is 1/100 to 50/100.

2. The water-based pigment dispersion of claim 1, wherein the water soluble or self-emulsifying thermoplastic resin containing carboxylic group is an acrylic resin or a polyurethane, and the thermoplastic resin has number average molecular weight of 2000 to 20000 and acid value of 30 to 300.

3. The water-based pigment dispersion of claim 1, wherein the cross-linking agent is an aqueous polymer of which reaction point for cross-linking is carboxylic group.

4. A water-based ink containing the water-based pigment dispersion of claim 1.

5. A process for preparing the water-based pigment dispersion of claim 1, comprising the steps of:
   (1) predispersing a pigment and a water soluble or self-emulsifying thermoplastic resin containing carboxylic group to give a mixture,
   (2) treating said mixture by a dispersing machine so as to disperse said pigment with said thermoplastic resin to give a water-based dispersion,
   (3) subsequently cross-linking said thermoplastic resin in said dispersion with a cross-linking agent to give a water-based dispersion having a pH of 6.0 to 7.8 and comprising said pigment and the cross-linked thermoplastic resin containing carboxylic group, and
   (4) adjusting the pH of the dispersion of step (3) containing said pigment and the cross-linked thermoplastic resin to alkaline range.

6. The water-based pigment dispersion of claim 1, wherein the solid matter concentration of the water-based pigment dispersion is 5 to 40% by weight.

7. The water-based pigment dispersion of claim 1, wherein said cross-linking agent is a member selected from the group consisting of a polycarbodiimide, an oxazoline polymer, a polyethyleneimine, an oligoester (meth)acrylate oligomer, and a urethane (meth)acrylate oligomer.

* * * * *